July 6, 1965   P. W. BRATH   3,193,816
FLOWMETER HAVING PHOTO-DIODE REGISTRATION OF GAS FLOW
Filed Jan. 30, 1962   2 Sheets-Sheet 1
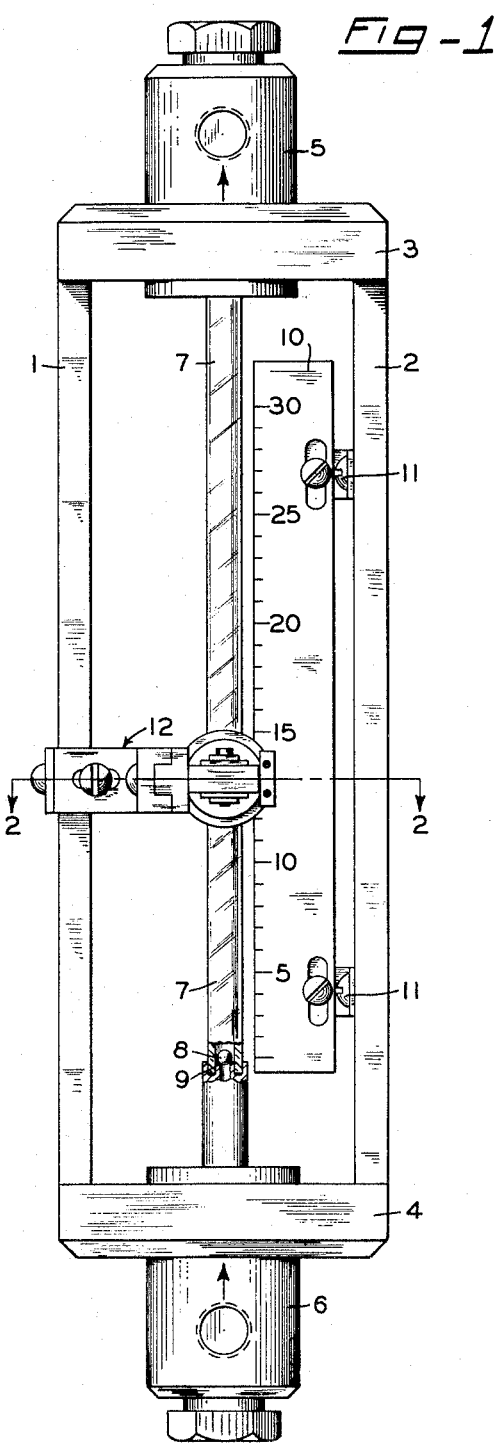
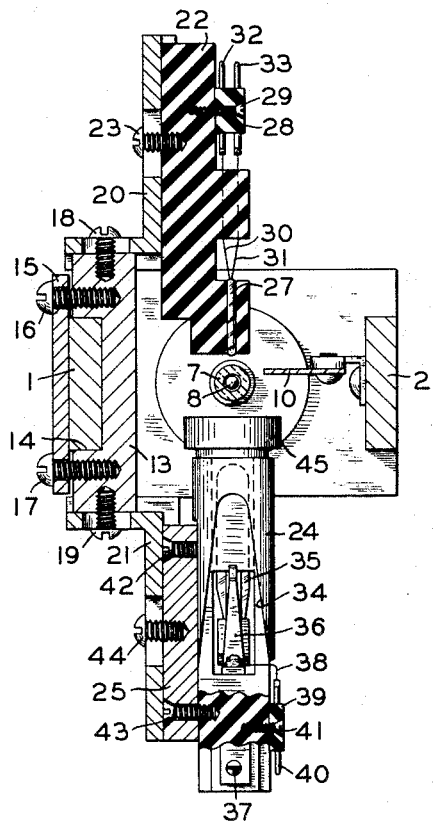
*INVENTOR.*
PETER W. BRATH
BY *A. A. Steinmiller*
*ATTORNEY*

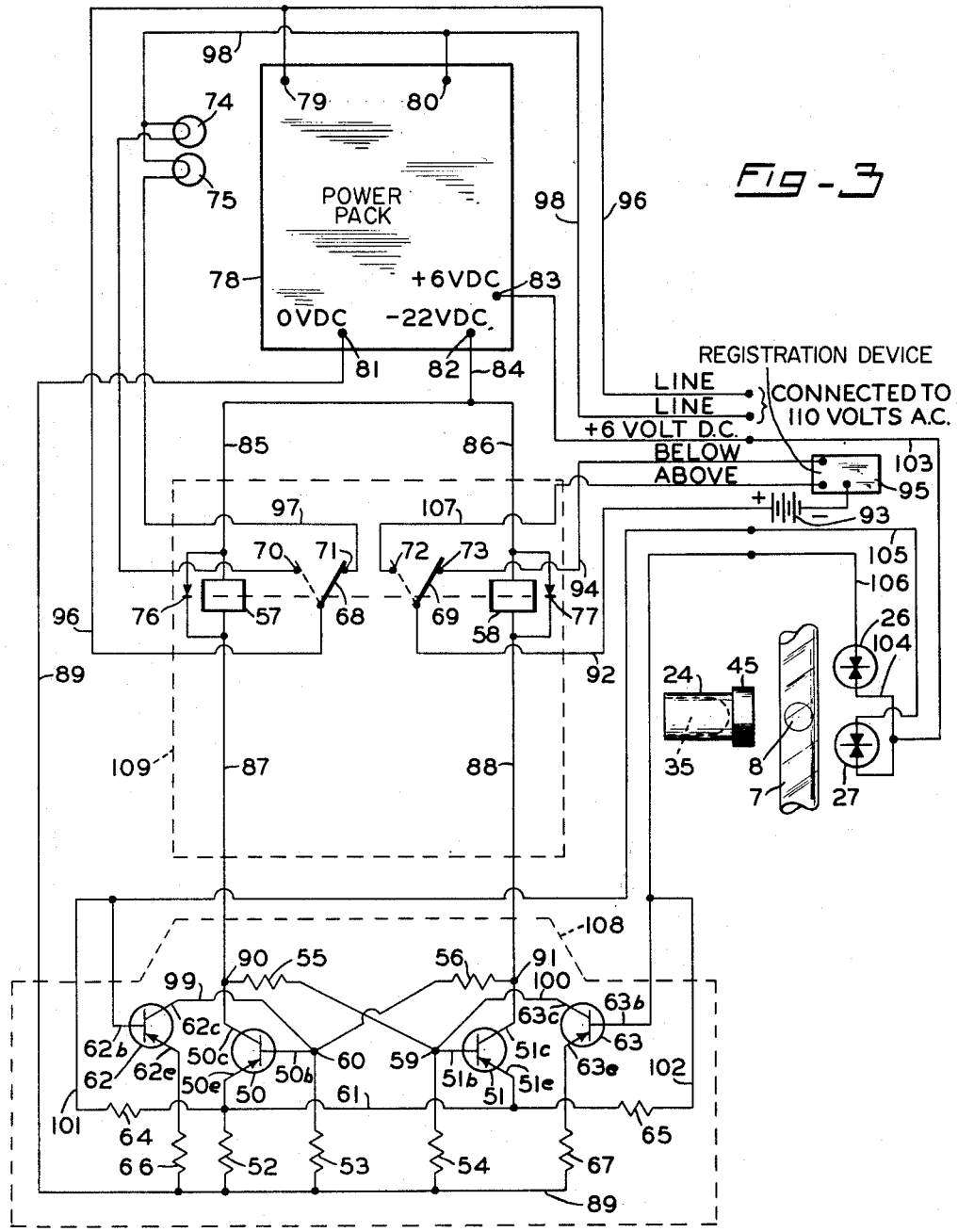

United States Patent Office 3,193,816
Patented July 6, 1965

3,193,816
FLOWMETER HAVING PHOTO-DIODE REGISTRATION OF GAS FLOW
Peter W. Brath, Pittsburgh, Pa., assignor to Westinghouse Air Brake Company, Wilmerding, Pa., a corporation of Pennsylvania
Filed Jan. 30, 1962, Ser. No. 169,821
6 Claims. (Cl. 340—239)

This invention relates to flowmeters or fluid flow measuring means, and more particularly to flowmeters embodying photoelectric means for detecting and effecting visual or other registration of a predetermined rate of flow of fluid through the flowmeter.

In the development of modern air brake valve test rack devices it was generally found that the flowmeter used on such devices, although satisfactorily workable, had to be manually attended and was not equipped with any recording or automatic indicating means. Being that the flowmeter readings are of essential importance in such devices and similar devices, it was found necessary to devise a new and improved flowmeter of the type comprising an opaque float positionable at different positions or levels in a calibrated translucent tube according to the rate of flow of fluid therethrough and novel means for automatically indicating and registering the float level without the necessity of a manual attendant.

According to the present invention, there is provided a new and novel fluid flow measuring means comprising a source of light projecting a beam through a flowmeter tube, a photo-diode means controlled by said beam of light and a new and novel amplifier circuitry for utilizing the output of said photo-diode means to effect visual and other registration of the rate of flow of fluid through the flowmeter tube.

In the accompanying drawings, FIG. 1 is a vertical elevational view of a form of flowmeter showing the photoelectric registration device as positioned about the flow tube of said flowmeter. FIG. 2 is a sectionalized view of the apparatus of FIG. 1 taken along line 2—2. FIG. 3 is a diagram illustrating the electrical circuitry controlled by the photoelectric registration device of FIGS. 1 and 2.

Description

Referring to FIGS. 1 and 2 of the drawings, the flowmeter shown comprises a box-like structure including a pair of side braces 1 and 2 fixed to a top plate 3 and a bottom plate 4. The top and bottom plates each have a centrally aligned pipe fitting 5 and 6, respectively, suitably attached as by welding which are connected in sealed relation by a vertical translucent flow tube 7 between said top and bottom plates. An opaque ball float 8 rests on stops 9 within the tube 7 and is positionable within said tube to a height determined by rate of flow of fluid therethrough from bottom to top as indicated by arrows on the pipe fittings 5 and 6.

The position of the ball float 8 within said tube 7 may be read visually on a scale 10 fastened to the brace 2 by screws 11; however, when utilized in automatic test racks or similar devices, it is not always possible nor expedient to take visual readings and, therefore, the exact flow rate reading must be indicated and registered by other means such as the novel photoelectric registration device 12 slidably mounted on the brace 1 and extending about the flow tube 7.

The photoelectric device 12 comprises a slide bar 13 having a groove 14 surrounding three sides of the brace 1 and slidably positioned up or down on said brace. A retaining bar 15 having two screws 16 and 17 is utilized for maintaining the slide bar 13 in a desired position by merely tightening said screws into the bar 13. Secured to each end of the bar 13 by screws 18 and 19 are L-shaped brackets 20 and 21. The bracket 20 supports the diode holder piece 22 secured thereto by a screw 23 and the bracket 21 supports a lamp holder piece 24 and spacing bar 25 suitably secured together by screw means.

The diode holder piece 22, of which only the lower half is shown in FIG. 2, has two passages for receiving two miniature photoelectric diodes 26 and 27 in parallel spaced vertical relation, one above the other. The diodes are very small having a diameter approximately the same size as the ball float 8. Only the diode 26 is visible in FIG. 2. For simplicity, the photoelectric diodes 26 and 27 are referred to hereinafter as photocells 26 and 27.

Each photocell has two wires connected thereto and extending through a spacer section of the holder piece 22 to a four-pronged terminal block 28 secured to the holder piece 22 by a screw 29. The photocell 26 shown in FIG. 2 has two wires 30 and 31 and two terminal contacts 32 and 33.

The lamp holder piece 24, shown partly in section, has an opening 34 (shown partly in dotted lines) extending from the one end into which is inserted a miniature lamp 35 shown partly in dotted lines. The lamp 35 is held in position by two contact clips 36, only one of which is shown, said contact clips being secured to the holder piece by screws 37. Two lead wires 38 connected to the contact clips 36, respectively, are connected to a suitable terminal block 39 having two terminal contacts 40 (only one of which is shown). The terminal block is secured to the holder piece 24 by a screw 41, while the holder piece 24 is secured to the spacing bar 25 by screws 42 and 43 which in turn is fastened to bracket 21 by a screw 44.

It should be noted that both the diode holder piece 22 and the lamp holder piece 24 are of non-conducting material.

Suitable lens means and beam directing means shown as a cap piece 45 are threaded into the opening in the lamp holder piece 24 to direct the lamp rays toward the photocells through the flow tube 7.

The circuitry shown in FIG. 3 includes a well-known two-stage direct coupled amplifier system of the type commonly called a "flip-flop" circuit or more technically, an "Eccles-Jordan" circuit. The portion of circuitry forming the flip-flop amplifier comprises the two transistors 50 and 51, resistors 52, 53, 54, 55 and 56 and relay windings 57 and 58 and the interconnecting wires. The transistor 50 is of the PNP type having three terminals 50b, 50c and 50e connected to the base, collector and emitter thereof, respectively. Similarly, the transistor 51 of the PNP type has a base terminal 51b, a collector terminal 51c, and an emitter terminal 51e. The resistors 54 and 55 form a voltage divider explained hereinafter with a junction point at 59. The resistors 53 and 56 form a voltage divider explained hereinafter with a junction point at 60. Resistors 54, 55 and 56 are of equal ohmage of for example 8200 ohms, while resistor 53 is of slightly less ohmage of for example 6800 ohms for purposes of initially triggering the amplifier, as explained hereinafter.

Resistor 52 is of small ohmage of say 220 ohms to provide stability to the amplifier in that said resistor 52 and the connected wire 61 is connected to both emitter terminals 50e and 51e.

The flip-flop circuit is a two-stage direct-coupled amplifier in which the output of the second stage is connected back to the input of the first stage. This flip-flop circuit has two stable conditions: one condition where the transistor 51 is conducting or "on" with the collector to emitter resistance thereof very low while the transistor 50 is not conducting or "off" with the collector to emitter resistance thereof very high, thereby effecting energization of the load resistance connected to the conducting transistor 51 which in this case is the relay winding 58; and a second condition where the transistor 50 is conducting or "on" with the collector to emitter resistance thereof very low while the transistor 51 is not conducting or "off" with the collector to emitter resistance thereof very high, thereby effecting energization of the load resistance connected to the conducting transistor 50 which in this case is the relay winding 57.

To trigger the amplifier circuitry from one stable condition to the second condition responsive to rate of flow, a new and novel trigger circuit is employed, said trigger circuit including PNP type transistors 62 and 63 with respective base, collector, and emitter elements 62b, 62c, 62e and 63b, 63c, 63e, resistors 64, 65, 66, 67, and interconnecting wires connected to two photocells 26 and 27 (shown enlarged) in the diode holder piece 22 of the bracket 20 on the flowmeter. The resistors 64 and 65 are of equal large ohmage of about 33,000 ohms to provide a voltage nearly equal and opposite to that supplied by the photocells as explained hereinafter. Resistors 66 and 67 are low ohmage of about 220 ohms each and are to provide stability to the transistors 62 and 63.

The relay windings 57 and 58 when energized control positioning of mechanical linked contact members 68 and 69 into or out of engagement with contacts 70, 71, 72 and 73, respectively, as explained hereinafter for controlling logic circuits and indicating lights 74 and 75. Small diodes 76 and 77 are connected across the relay windings 57 and 58, respectively, to prevent inductive surges therethrough.

A power pack 78 or similar source of different direct current voltages is included with terminals 79 and 80 connected to normal line current of about 110 volts alternating current, said line voltage being rectified and divided to supply direct current voltage to terminals 81, 82 and 83, said voltages being respectively, base voltage or 0 at terminal 81, negative voltage of say $-22$ volts at terminal 82, and positive voltage of say $+6$ volts at terminal 83.

*Operation*

In operation, the flowmeter is installed in a fluid flow system such that the fluid (presumably air) flowing therethrough, flows through the flowmeter from the bottom pipe fitting 6 up through the tube 7 and out through the pipe fitting 5. The rate of flow of fluid through the aforesaid system is indicated by the positioning of the ball float 8 in the tube 7 as calibrated on the scale 10. An automatic registration of predetermined rates of fluid flow may be detected by placing the photoelectric device 12 at the required predtermined rate of fluid flow level of indication on the scale 10 and permitting the ball float 8 to interrupt the passage of light through said tube 7 at a point slightly below (location of photocell 27) and a point slightly above (location of photocell 26) said indication which in turn effects operation of the accompanying circuitry in a manner hereinafter described to effect registration of said predetermined rate of flow through the use of indicating lights 74 and 75 and the energization of a so-called logic circuit which operates recording equipment.

When the flip-flop circuitry is initially energized by the closure of switch means (not shown) in the power pack 78, a negative voltage of say $-22$ volts direct current is applied to the amplifier circuitry by way of terminal 82, wire 84, and parallel wires 85 and 86 through each of the relay windings 57 and 58 and wires 87 and 88 to the transistors 50 and 51 wherein conductive operation of only one of said transistors 50 and 51 will determine the completion of the circuit to the base wire 89 which is connected to the emitter side of both transistors 50 and 51 by way of resistor 52, wire 61 connected to emitter terminals 50e and 51e, the other end of base wire 89 being connected to the 0 (zero) voltage terminal 81 of the power pack 78. The determination of conductivity of transistors 50 and 51 is as follows: If it were molecularly possible that each of the resistances 53, 54, 55 and 56 were of the same ohmage, parallel circuitry would exist from junction point 90 through the conducting (therefore low resistant) transistor 50 and resistors 55 and 54 to the base wire 89 and also from junction point 91 through the conducting (therefore low resistant) transistor 51 and resistors 56 and 53 to the base wire 89. The fact that the resistance of the path through the voltage divider circuits of resistors 55, 54 and 56, 53 is greater than the resistance of the path through the transistors 50 and 51 (very low when conducting) the voltage at the juncture points 60 and 59 will be a slightly more negative voltage than the negative voltage at the emitter terminals 50e and 51e which would seem to insure that both transistors would be conducting. However, in accordance with the Eccles-Jordan theory, it is physically impossible to arrange the molecular structure of the resistors 53, 54, 55, 56 to be of equal ohmage and therefore the voltage divider with the least resistance will tend to make the voltage at the aforedescribed junction point (60 or 59) of a less negative degree than the negative voltage at the emitter terminal of the associated transistor to cause said transistor to cut off or become non-conducting. This feature just described is assisted herein by making the resistor 53 of smaller ohmage than the resistors 54, 55 and 56, thereby insuring that the voltage at junction point 60 is less negative than the negative voltage at the emitter terminal 50e, thereby in accordance with transistor theory, causing the transistor 50 to become non-conductive or "off." The transistor 51 is conducting (voltage at junction point 59 is more negative than at emitter terminal 51e) thereby offering very little collector to emitter resistance through the transistor 51 such that the $-22$ volts supplied by the power pack will take the path of least resistance by way of wire 84, wire 86, relay winding 58, wire 88, transistor 51 to emitter terminal 51e, wire 61, resistance 52 to the base wire 89 of 0 voltage thereby energizing the relay winding 58 to a degree sufficient to move the contact member 69 to the right-hand position (in which it is shown in the drawing) to energize the "below" logic circuit shown herein as only an incoming supply wire 92 for a power source such as battery 93 and an outgoing wire 94 for purposes of energizing any suitable form of registration device 95 such as a tape recording device, audible signal and the like, the details of which are not necessary for an understanding of this invention. Simultaneously, the mechanically linked contace member 68 is positioned in a right-hand position to energize a "below" indicating lamp 75 to indicate that the rate of flow of fluid in the flowmeter is below a predetermined rate, said circuit including the supply wire 96, from a source of line voltage of say 110 A.C., contact member 68, wire 97, lamp 75 and return wire 98.

It should be noted that wire 61 being connected to both emitter terminals 50e and 51e will be constantly energized with a negative voltage of say $-2.5$ volts in that one or the other of the transistors 50 or 51 will be conducting at all times in this type of circuitry.

To trigger the amplifier to either "flip" condition (transistor 51 conducting or "on," and transistor 50 nonconducting or "off") or "flop" condition (transistor 51 non-conducting or "off," and transistor 50 conducting or "on"), it is merely necessary to parallel either of the resistances 53 or 54, respectively, with a low resistance. This is done according to this invention with novel circuitry utilizing additional transistors 62 and 63 with series resistors 66 and 67, respectively, under the control of the photocells 26 and 27.

Wire 99, transistor 62 and resistor 66 are in parallel with resistor 53 associated with transistor 50; therefore, if the transistor 62 is "on" (conducting), the resistance therethrough is very low thereby making the voltage at the junction point 60 less negative relative to the negative voltage at the emitter terminal 50e causing transistor 50 to be non-conducting or "off." Similarly, if transistor 63 is "on" (conducting), the resistance therethrough is very low thereby utilizing the parallel circuit of wire 100, transistor 63 and resistor 67 to make the voltage at the junction point 59 less negative relative to the negative voltage at the emitter terminal 51e causing transistor 51 to be non-conducting or "off." In view of this, it should be apparent that in order to turn transistor 50 "off," transistor 62 must be "on," and in order to turn transistor 51 "off," transistor 63 must be "on."

Transistors 62 and 63 can be turned "on" by making base terminals 62b and 63b more negative than the negative voltage of the emitter terminals 62e and 63e thereof, respectively. This can be done by connecting the wire 61, constantly negative at say −2.5 volts, to the base terminals of each transistor 62 and 63 by way of resistor 64 and wire 101, or resistor 65 and wire 102. Resistors 64 and 65 are of larger ohmage of say 33,000 ohms to permit a reasonably small negative voltage to be applied to the base terminals of transistors 62 and 63. The photocells 26 and 27 are utilized in a manner now described to prevent both of transistors 62 and 63 from being turned on (conducting) at the same time.

Under normal conditions, light from the lamp 35 shining through the tube 7 of the flowmeter falls on both the upper photocell 26 and the lower photocell 27 to cause them to be conductive or "on," to permit a positive voltage of say +1.5 to +3.5 volts to be applied to the base terminals 62b and 63b of both transistors 62 and 63. The circuitry for this is from the +6 volt terminal 83 of the power pack 78 by way of wire 103 to a common jumper wire 104 connected to the incoming terminals of each photocell, photocells 26 and 27 and wires 105 and 106 to respective transistors 62 and 63. This positive voltage of +1.5 to +3.5 applied to the base terminals of each transistor opposes and is greater than the negative voltages applied thereto at wires 101 and 102 thereby causing the voltage at said base terminals to be less negative (positive in this instance) than the negative voltage at the emitter terminals thereof to thereby render said transistors both nonconducting or off.

As mentioned hereinbefore, when the amplifier circuitry is initially energized, the unbalance or negative voltages created by the difference in ohmage of resistor 53 causes the amplifier to condition such that transistor 51 is "on" (conducting) and transistor 50 is "off" (nonconducting) or as called herein, a "flip" condition in which the relay winding 58 is energized to in turn energize the "below" lamp 75 and parallel "below" logic circuit at wire 94. The transistors 62 and 63 in this condition are both "off" (non-conducting) due to the lamp 35 shining on both the photocells as described hereinbefore.

It should be noted that the ball float 8 and the photocells 26 and 27 are of such a size and positioned in such a manner that the beam of light may fall on both photocells or movement of the ball float 8 in the tube 7 may cut off the beam of light to either one or the other of said photocells, but at no tme is it possible for the ball float 8 to cut off the beam from both photocells.

If the rate of fluid flow through tube 7 increases to a point where the ball float 8 moves up in the tube to cut off the beam of light to the lower photocell 27, the said photocell 27 will be off, that is, no longer conductive. With the photocell 27 off, the application of the positive +1.5 to +3.5 volts to the base terminal 62b is stopped to permit the negative voltage applied thereto (explained hereinbefore) to cause the base terminal 62b to become more negative relative to the 0 (zero) voltage at the emitter terminal 62e, thereby rendering the transistor 62 conductive or "on." With transistor 62 conductive or "on," the collector to emitter resistance becomes very low to cause the voltage at junction point 60 to become even less negative than the negative voltage at the emitter terminal 50e; therefore, transistor 50 already "off" (explained hereinbefore) will remain "off" as the ball float 8 rises past the lower photocell 27. Thus, the transistor 51 remains "on" to maintain relay winding 58 energized to maintain the "below" lamp 75 and logic circuit energized.

If the rate of fluid flow through tube 7 continues to increase such that the ball float 8 moves upward past the lower photocell 27 to a position cutting off the light beam to the upper photocell 26, the circuitry through the photocell 27 is again completed and the circuitry at the photocell 26 is opened.

With photocell 27 again conducting, the positive +1.5 to +3.5 voltage is applied to the base terminal 62b of transistor 62 in opposition to the negative voltage applied thereto to effect turning off of transistor 62 and a consequent changing of the negative voltage at the junction point 60 to make said voltage more negative than it was, but not more negative than the negative voltage at the emitter terminal 50e thereby maintaining transistor 50 turned off. Almost simultaneously with the turning on of photocell 27, the photocell 26 is turned off by the ball float in that the two photocells are placed very close to each other as described hereinbefore. With photocell 26 turned off, the positive +1.5 to +3.5 voltage applied to base terminal 63b is removed permitting the negative voltage applied thereto to cause the base terminal 63b to become more negative than the emitter terminal 63e to thereby render transistor 63 conducting or turned on. As explained hereinbefore, with transistor 63 turned on, the transistor 51 will be turned off. With transistor 51 turned off, the collector to emitter resistance becomes very high thereby causing the voltage in the parallel voltage divider at junction point 60 to become more negative to a degree where it is relatively more negative than the negative voltage at the emitter terminal 50e, thereby turning transistor 50 on.

With transistor 50 turned on and transistor 51 turned off as just explained, in a so-called "flop" condition, the resistance offered in the circuitry including said transistor 51 is very high relative to the resistance offered by the parallel circuitry including transistor 50, and therefore the current through the relay winding 58 becomes insignificant while that in the relay winding 57 becomes sufficient to cause the contact members 68 and 69 to shift to the left-hand position in engagement with the contacts 70 and 72, respectively, to deenergize the "below" lamp 75 and "below" logic circuitry at wires 92 and 94 while energizing the "above" lamp 74 and "above" logic circuitry including wires 92 and 107 to the registration device 95 to effect recording of the flow rate by said device.

If the ball float 8 rises above the photocell 26, the photocell 26 is again turned on and the transistor 63 is turned off, but this will not turn on the transistor 51 nor turn off transistor 50 due to the fact that when transistor 50 was turned on, the voltage at junction point 59 became less negative than the negative voltage at the emitter terminal 51e, thereby keeping transistor 51 turned off, and with transistor 51 turned off, transistor 50 is turned on as explained hereinbefore.

During descent of the ball float 8 from the condition just described due to the rate of fluid flow decreasing in the tube 7, the ball float 8 moves to a position cutting off the light beam to the upper photocell 26, to thereby again turn off said photocell. With photocell 26 again turned off as explained hereinbefore, the transistor 63 is turned on to effect turning off of transistor 51 and turning on of transistor 50, a "flop" condition that already existed, therefore, no change occurs.

It can thus be seen that once the amplifier has been placed in the so-called "flop" condition indicating "above" on the "above" lamp 74, it will remain so conditioned until the ball float 8 descends sufficiently to pass the photocell 27, at which time the transistor 63 is off and the transistor 62 is turned on to effect turning off of transistor 50 which in turn causes turning on of transistor 51 in the "flip" condition in a manner similar to that described with the turning on of transistor 50. In the "flip" condition, the relay winding 58 is effective as explained to energize the "below" lamp and "below" logic circuitry.

Further descent of the ball float 8 below the photocell 27 will effect no change in the "flip" condition in that transistor 62 is merely turned off with the transistor 51 remaining on and the transistor 50 remaining off.

From the foregoing, it can be seen that the amplifier is conditioned in a "flip" condition with "below" signals and logic circuitry energized until the photocell 26 is turned off and then a "flop" condition is effected with "above" signals and logic circuitry and remains effective regardless of the condition of photocell 26 until the photocell 27 is turned off which can only be accomplished while the photocell 26 is on.

The action of the flip-flop amplifier is very fast, being capable of changing from one condition to another in a matter of micro-seconds, therefore, it can be seen that with the fast-acting triggering action, a fast-acting amplifier, and a fast-acting relay, the detection of the ball float position is fast and positive regardless of the speed of the ball float.

For purposes of handling, the amplifier circuitry and the relay circuitry should be located in separate cabinets shown herein as dotted casings 108 and 109.

Having now described the invention, what I claim as new and desire to secure by Letters Patent, is:

1. In a fluid flow rate measuring device of the type having a calibrated flow tube with a float means therein positionable at different locations within the tube in accordance with the rate of flow of fluid therethrough, apparatus for automatically registering the rate of flow of fluid through said device with respect to a selected rate of flow, said apparatus comprising in combination:
   (a) a first circuit,
   (b) a second circuit,
   (c) means controlled accordingly as said first or second circuits are selectively energized to register a rate of flow relative to a selected rate,
   (d) a bi-stable amplifier means having a first stable condition in which it effects energization of said first circuit and a second stable condition in which it effects energization of said second circuit,
   (e) a source of beamed light the rays of which pass through the calibrated flow tube of the measuring device simultaneously at first and second closely spaced locations respectively indicative of a first rate of fluid flow through the flow tube, and a second rate of fluid flow through the flow tube greater than said first rate,
   (f) photoelectric means operatively responsive to the rays of said beamed light passing through the flow tube at said first and second locations, said rays of beamed light being subject to interruption of impingement on said photoelectric means at either one of said locations by the float means as it moves within said flow tube, and
   (g) transistor means operative cooperatively with said photoelectric means as the float means moves up to and in said first location in correspondence with a rate of fluid flow up to and including said first selected rate of flow, to effect operation of said amplifier means in said first stable condition, and operative cooperatively with photoelectric means as the float means moves in and above said second location in correspondence with a rate of fluid flow equal to and greater than said second selected rate of flow, to effect operation of said amplifier means in said second stable condition.

2. The combination claimed in claim 1, further characterized in that said transistor means is additionally operative cooperatively with said photoelectric means as the float means moves in a zone intermediate said first and second locations to effect operation of said amplifier means selectively in the first or second stable condition depending upon which stable condition existed at the time the float means last entered the zone intermediate said first and second locations.

3. The combination claimed in claim 1, further characterized by a pair of indicating lamp means operative respectively in concurrence with energization of said first circuit and said second circuit to provide visual indication of the rate of flow of fluid through said device.

4. The combination claimed in claim 1, further characterized by relay means operatively controlled by said amplifier means in its said first stable condition for establishing and causing energization of said first circuit while interrupting said second circuit, and operatively controlled by said amplifier means in its said second stable condition for establishing and causing energization of said second circuit while interrupting said first circuit.

5. The combination claimed in claim 1, further characterized in that said photoelectric means includes a pair of photo-diodes positioned respectively at said first and second locations whereby one of said photo-diodes is operatively controlled by said float means passing through said first location in either direction and the other is operatively controlled by said float means passing through said second location in either direction.

6. In a fluid flow rate measuring device of the type having a calibrated flow tube with a float means therein positionable at different locations within the tube in accordance with the rate of flow of fluid therethrough, apparatus for automatically registering the rate of flow of fluid through said device with respect to a selected rate of flow, said apparatus comprising in combination:
   (a) a first circuit,
   (b) a second circuit,
   (c) means controlled accordingly as said first or second circuits are selectively energized to register a rate of flow relative to a selected rate,
   (d) a source of beamed light the rays of which pass through the calibrated flow tube of the measuring device simultaneously at first and second closely spaced locations respectively indicative of a first and a second selected rate of fluid flow through the flow tube,
   (e) a pair of photoelectric means at a first and a second one of said spaced locations respectively, and operatively responsive to the rays of said beamed light passing through the flow tube, said rays of beamed light being subject to interruption of impingement on said photoelectric means at either one of said spaced locations by the float means as it moves within said flow tube,
   (f) a transistorized bi-stable amplifier means of the direct coupled flip-flop type having a first stable condition in which energization of said first circuit only is effected and a second stable condition in which energization of said second circuit only is effected, (g) a first transistor means operative cooperatively with said photoelectric means as the float means moves up to and in the first one of said spaced locations concurrent with a rate of fluid flow lower than and including said first selected rate of flow, to effect triggering of said amplifier means to said first stable condition, and (h) second transistor means operative cooperatively with photoelectric means as the float means moves in and above the second one of said spaced locations concurrent with a rate of fluid flow equal to and greater than said second selected rate of flow, to effect triggering of said amplifier means to said second stable condition.

References Cited by the Examiner

UNITED STATES PATENTS

| | | | |
|---|---|---|---|
| 2,503,091 | 4/50 | Brooke et al. | 250—224 XR |
| 2,790,088 | 4/57 | Shive. | |
| 2,933,185 | 4/60 | Coleman et al. | 250—209 XR |
| 2,980,897 | 4/61 | Meszaros | 340—248 |
| 2,994,783 | 8/61 | Looschen | 250—209 XR |
| 3,017,524 | 1/62 | Koletsky et al. | 307—88.5 |
| 3,065,388 | 11/62 | Pinckaers | 307—88.5 |
| 3,068,450 | 11/62 | Fletcher et al. | 340—213 XR |

NEIL C. READ, *Primary Examiner.*